United States Patent
Li et al.

(10) Patent No.: US 8,078,066 B2
(45) Date of Patent: Dec. 13, 2011

(54) OPTICAL COHERENT RECEIVER, FREQUENCY OFFSET ESTIMATING APPARATUS AND METHOD FOR OPTICAL COHERENT RECEIVER

(75) Inventors: Lei Li, Beijing (CN); Zhenning Tao, Beijing (CN); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 595 days.

(21) Appl. No.: 12/289,072

(22) Filed: Oct. 20, 2008

(65) Prior Publication Data
US 2009/0129787 A1 May 21, 2009

(30) Foreign Application Priority Data
Nov. 19, 2007 (CN) .......................... 2007 1 0166788

(51) Int. Cl.
*H04B 10/06* (2006.01)
(52) U.S. Cl. ......... 398/209; 398/202; 398/203; 398/208
(58) Field of Classification Search .................. None
See application file for complete search history.

(56) References Cited

U.S. PATENT DOCUMENTS

| 7,894,728 | B1 * | 2/2011 | Sun et al. | 398/208 |
|---|---|---|---|---|
| 7,899,340 | B1 * | 3/2011 | Bontu et al. | 398/209 |
| 2006/0245766 | A1 * | 11/2006 | Taylor | 398/208 |
| 2007/0036555 | A1 * | 2/2007 | Chen et al. | 398/188 |
| 2007/0206963 | A1 * | 9/2007 | Koc | 398/202 |

* cited by examiner

*Primary Examiner* — Kenneth N Vanderpuye
*Assistant Examiner* — Darren E Wolf
(74) *Attorney, Agent, or Firm* — Staas & Halsey LLP

(57) ABSTRACT

The present invention discloses an optical coherent receiver, and a frequency offset estimating apparatus and a frequency offset estimating method for use in the optical coherent receiver. The optical coherent receiver includes a front end processing section for changing an optical signal into a base band digital electric signal. The frequency offset estimating apparatus comprises a phase offset calculating section, for calculating a phase offset in said base band digital electric signal; a phase offset change calculating section, for calculating a change of said phase offset, namely a phase offset change, in accordance with the phase offset calculated by said phase offset calculating section; an ambiguity deciding section, for deciding whether there is ambiguity in said phase offset change calculated by said phase offset change calculating section, and outputting the phase offset change having no ambiguity; and a loop filtering section, for acquiring a weighted average of the phase offset change outputted by said ambiguity deciding section.

9 Claims, 6 Drawing Sheets

US 8,078,066 B2

OPTICAL COHERENT RECEIVER, FREQUENCY OFFSET ESTIMATING APPARATUS AND METHOD FOR OPTICAL COHERENT RECEIVER

CROSS-REFERENCE TO RELATED APPLICATIONS

This application claims the benefit of Chinese Application No. 200710166788.3, filed Nov. 19, 2007 in the State Intellectual Property Office of the P.R. China, the disclosure of which is incorporated herein by reference.

BACKGROUND OF THE INVENTION

1. Field of the Invention

The present invention relates to optical communications, and more particularly to an optical coherent receiver for optical communications.

2. Description of the Related Art

With the gradual enhancement on the requirements of capacity and flexibility of the optical communication system, the coherent optical communication technology has become more and more important. In comparison with incoherent technology (such as on-off key, OOK) or auto coherent technology (such as differential quadrature phase-shift keying, DQPSK), the coherent technology has the following advantages: optical signal-to-noise ratio (OSNR) gain of approximately 3 dB; the capability to use more efficient modulation technologies (such as quadrature modulation, QAM) to enhance transmission capacity, and the capabilities to make convenient use of electric equalization technology in response to channel change, and lower production cost, etc. Like the case in electric coherent technology, an optical coherent receiver also requires a device to control the frequency of a local oscillator to let the difference (namely frequency offset) between this frequency and the frequency of a carrier wave be zero. However, in the optical communication system, there is no such information as the pilot in the wireless communication system to directly extract the frequency of the carrier wave, so that the first step in controlling the frequency offset in the optical coherent receiver is to estimate the frequency offset from the received signal. The characteristics of the optical communication system put the following demands on the frequency offset estimating apparatus in the optical coherent receiver. First, due to such problems of the laser as the temperature stability and aging, etc., the frequency offset might be as high as −5 GHz to +5 GHz in the actual system. Second, due to the non-stop transmission characteristics of the optical communication system, estimation of the frequency offset must be extremely precise and stable. Finally, due to the very high rate of the signal transmitted by optical communication, the corresponding AD rate and digital signal rate are also very high, so it is required that the computational complexity of the frequency offset estimating method has to be low. To sum it up, the optical coherent receiver requires a stable method and apparatus having a large range and a low computational complexity to perform frequency offset estimation.

FIG. 1 shows the position of a frequency offset estimating apparatus 110 in an optical coherent receiver. In the figure an optical frequency mixer 102, a local oscillator 103, photoelectric detectors 104, 105, analog-to-digital converters (ADC) 106, 107 and a controller 112 constitute a front end processing section (front end processor) 118 of the coherent receiver. The front end processing section 118 changes an optical signal 101 into a base band digital electric signal I+jQ 108, where I is a inphase component and Q is a quadrature component. The frequency offset estimating apparatus 110 estimates a numerical value 111 of the frequency offset in accordance with the base band digital electric signal I+jQ 108, and transmits it to the control module 112 to control the frequency of the local oscillator so that the frequency offset will be zero. A data recovery 109 restores data and outputs the restored data.

FIG. 2 illustrates a method for realizing a frequency offset estimating apparatus as proposed by Andreas Leven, et al., ("Frequency Estimation in Intradyne Reception", IEEE Photonics Technology Letters, Volume: 19, No. 6, Mar. 15, 2007, pages 366-368). In FIG. 2, a register 201 and a conjugate calculator 202 delay an inputted base band electric signal by one symbol period, and obtain its conjugate to obtain a signal 207. The signal 207 is then multiplied at a multiplier 203 with an inputted base band electric signal to obtain a signal 208. The foregoing delaying, conjugating and multiplying calculations remove phase noise (the phase of the local oscillation and carrier wave randomly change, and can be considered as constant within several adjacent symbols). The phase of the signal 208 contains a difference between data information of two adjacent symbols and a phase offset within one symbol period introduced by the frequency offset. Subsequently, a quartic calculator 204 removes the data information, a complex summer 205 sums N data of a signal 209 to remove the influence of noise, and finally a phase change 111 within one symbol period and introduced by the frequency offset is obtained by a ¼ argument calculator 206. Since the symbol period (namely 1/symbol rate) is an invariant value to an optical transmission system, the phase change 111 directly represents the frequency offset to be estimated. For example, if the value of the phase change 111 is θ, the corresponding frequency offset will be $(\theta/2\pi) \times Br$ (where Br indicates the symbol rate). There are two problems in the foregoing prior art method. First, since the output range of the ¼ argument calculator 206 is $[-\pi/4, +\pi/4]$, the range of the frequency offset estimable by this method is $[-Br/8, +Br/8]$. The highest symbol rate achievable in the currently available optical transmission is 20 G symbol/second, and, taking such a system as an example, the range of the frequency offset estimable by this method is mere [−2.5 GHz, +2.5 GHz], which falls far short of the required [−5 GHz, 5 GHz]. Second, this method contains not only the multiplying calculation of complex numbers but also the quartic calculation of complex numbers, so that such computational complexity is far heavier than addition and subtraction calculation or logical calculation performed on real numbers. Insofar as the current digital signal processing technology is concerned, it is almost impossible to perform such complex calculations on symbols having rates as high as 10 G or 20 G symbol/second in the optical transmission system.

SUMMARY OF THE INVENTION

The present invention is proposed in view of the above problems existent in the state of the art, and aims to provide a method and an apparatus for estimating frequency offset in an optical coherent receiver, which method and apparatus are capable of achieving stable, precise and fast estimation to frequency offsets possibly occurring in the actual system.

In order to achieve the objective of the present invention, there is provided according to the first aspect of the present invention a frequency offset estimating apparatus for an optical coherent receiver, which includes a front end processing section for changing an optical signal into a base band digital electric signal. The frequency offset estimating apparatus comprises a phase offset calculating section (phase offset calculator), for calculating a phase offset in said base band digital electric signal; a phase offset change calculating section (phase offset change calculator), for calculating a change of said phase offset, namely a phase offset change, in accordance with the phase offset calculated by said phase offset calculating section; an ambiguity deciding section, for deciding whether there is ambiguity in said phase offset change calculated by said phase offset change calculating section, and outputting the phase offset change having no ambiguity; and a loop filtering section (loop filter), for acquiring a weighted average of the phase offset change outputted by said ambiguity deciding section.

According to the second aspect of the present invention, there is provided the frequency offset estimating apparatus for an optical coherent receiver according to the first aspect of the present invention, characterized in that said ambiguity deciding section decides whether there is ambiguity in said phase offset change by comparing the absolute value of said phase offset change with a predetermined threshold value.

According to the third aspect of the present invention, there is provided the frequency offset estimating apparatus for an optical coherent receiver according to the second aspect of the present invention, characterized in that said predetermined threshold value is π/4 or π/2 or π.

According to the fourth aspect of the present invention, there is provided the frequency offset estimating apparatus for an optical coherent receiver according to the first aspect of the present invention, characterized in that said optical coherent receiver employs a phase modulation mode, such as QPSK, 8PSK, etc.

According to the fifth aspect of the present invention, there is provided the frequency offset estimating apparatus for an optical coherent receiver according to any of the first to fourth aspects of the present invention, characterized in that said phase offset calculating section comprises an argument calculator, a pre-decider and a phase offset calculating unit, (argument-based phase offset calculator), wherein said argument calculator acquires an argument of the base band digital electric signal; said pre-decider decides data information of said base band digital electric signal in accordance with the argument acquired by said argument calculator, a previous phase offset calculated by said phase offset calculating section and a previous output of said loop filtering section; and said phase offset calculating unit calculates the phase offset in said base band digital electric signal in accordance with a deciding result of said pre-decider; said phase offset change calculating section comprises a phase offset registering section (phase offset register) and a subtracting section (subtractor), wherein said phase offset registering section registers the phase offset calculated by said phase offset calculating section; and said subtracting section subtracts a previous phase offset registered in said phase offset registering section from a current phase offset calculated by said phase offset calculating section to acquire said phase offset change.

According to the sixth aspect of the present invention, there is provided the frequency offset estimating apparatus for an optical coherent receiver according to any of the first to fourth aspects of the present invention, characterized in that said phase offset calculating section comprises an extraction shunter, a first phase offset calculating section (first phase offset calculator) and a second phase offset calculating section (second phase offset calculator), wherein said extraction shunter acquires two shunting signals, namely a first shunting signal and a second shunting signal, formed by adjacent symbols in said base band digital electric signal; said first phase offset calculating section calculates a phase offset of said first shunting signal; and said second phase offset calculating section calculates a phase offset of said second shunting signal; said phase offset change calculating section comprises a subtracting section for subtracting the phase offset of said second shunting signal calculated by said second phase offset calculating section from the phase offset of said first shunting signal calculated by said first phase offset calculating section to acquire said phase offset change.

According to the seventh aspect of the present invention, there is provided the frequency offset estimating apparatus for an optical coherent receiver according to the sixth aspect of the present invention, characterized in that said first phase offset calculating section comprises a first argument calculator, a first pre-decider and a first offset calculating unit, wherein said first argument calculator acquires an argument of said first shunting signal; said first pre-decider decides data information of said first shunting signal in accordance with the argument acquired by said first argument calculator; and said first offset calculating unit calculates the phase offset in said first shunting signal in accordance with a deciding result of said first pre-decider; said second phase offset calculating section comprises a second argument calculator, a second pre-decider and a second offset calculating unit, wherein said second argument calculator acquires an argument of said second shunting signal; said second pre-decider decides data information in said second shunting signal in accordance with the argument acquired by said second argument calculator, the phase offset in said first shunting signal calculated by said first phase offset calculating section and an output fed back from said loop filtering section; and said second offset calculating unit calculates the phase offset in said second shunting signal in accordance with a deciding result of said second pre-decider.

According to the eighth aspect of the present invention, there is provided the frequency offset estimating apparatus for an optical coherent receiver according to the sixth aspect of the present invention, characterized in that the extraction shunter is realized by one of the following two structures, namely the first structure: the extraction shunter comprises a first down sampler, a delay unit, and a second down sampler, wherein the first down sampler performs a first N to 1 down sampling on the base band digital electric signal, and takes the sampled signal as the first shunting signal; the delay unit delays the base band digital electric signal for one symbol; and the second down sampler performs a second N to 1 down sampling on the base band digital electric signal, and takes the sampled signal as the second shunting signal, wherein N is an integer greater than 1; and the second structure: the extraction shunter comprises a serial-to-parallel converter that performs serial-to-parallel conversion on the base band digital electric signal, outputs two adjacent signals in a plurality of converted parallel signals as the first shunting signal and the second shunting signal, and grounds other signals in the plurality of converted parallel signals.

According to the ninth aspect of the present invention, there is provided an optical coherent receiver, characterized in comprising the frequency offset estimating apparatus for an optical coherent receiver according to any of the aforementioned first to eighth aspects.

According to the tenth aspect of the present invention, there is provided the optical coherent receiver according to the ninth aspect of the present invention, characterized in that the optical coherent receiver further comprises a coarse frequency offset monitoring apparatus (coarse frequency offset monitor), a digital equalizer and a selector, wherein said coarse frequency offset monitoring apparatus receives a signal previous to said digital equalizer; said frequency offset estimating apparatus for an optical coherent receiver receives a signal outputted from said digital equalizer; and said selector selects one output of said coarse frequency offset monitoring apparatus and said frequency offset estimating apparatus for an optical coherent receiver in accordance with a residue chrominance chromatic dispersion and a polarization mode chromatic dispersion in the signal outputted from said digital equalizer.

According to the eleventh aspect of the present invention, there is provided a frequency offset estimating method for an optical coherent receiver including a front end processing section for changing an optical signal into a base band digital electric signal, said frequency offset estimating method comprising: a phase offset calculating step, for calculating a phase offset in said base band digital electric signal; a phase offset change calculating step, for calculating a change of said phase offset, namely a phase offset change, in accordance with the phase offset calculated in said phase offset calculating step; an ambiguity deciding step, for deciding whether there is ambiguity in said phase offset change calculated in said phase offset change calculating step, and outputting the phase offset change having no ambiguity; and a loop filtering step, for acquiring a weighted average of the phase offset change outputted from said ambiguity deciding step.

According to the twelfth aspect of the present invention, there is provided the frequency offset estimating apparatus for an optical coherent receiver according to any of the fifth to eighth aspects of the present invention, characterized in that the pre-decider comprises a subtracter, a $2\pi$ modulus calculator, and a $\pi/2$ quotient rounder, wherein the subtracter removes the feedback phase offset from the argument obtained by the argument calculator; the $2\pi$ modulus calculator performs $2\pi$ modulus calculation on the signal having been removed of the feedback phase offset by the phase offset removing section to restrict the signal between 0 to $2\pi$; and the $\pi/2$ quotient rounder divides the signal having been restricted by the $2\pi$ modulus calculator between 0 to $2\pi$ by a predetermined value, and obtains the integral portion of the quotient.

According to the thirteenth aspect of the present invention, there is provided the frequency offset estimating apparatus for an optical coherent receiver according to any of the fifth to eighth aspects of the present invention, characterized in that the pre-decider comprises a first subtracter, a $2\pi$ modulus calculator, a first deciding section, a second subtracter, a second deciding section, and a lookup table determining section, wherein the first subtracter removes the feedback phase offset from the argument obtained by the argument calculator; the $2\pi$ modulus calculator performs $2\pi$ modulus calculation on the signal having been removed of the feedback phase offset to restrict the signal between 0 to $2\pi$; the first deciding section compares the output of the $2\pi$ modulus calculator with a first threshold value; the second subtracter subtracts the first threshold value from the output of the $2\pi$ modulus calculator when the output of the $2\pi$ modulus calculator is greater than the first threshold value; the second deciding section compares the output of the second subtracter with a second threshold value; and the lookup table determining section determines the data phase in the base band electric signal through a lookup table and in accordance with the outputs of the first deciding section and the second deciding section.

According to still another aspect of the present invention, there is provided a computer program capable of enabling, when executed by a computer or a logical component, the computer or the logical component to implement the method according to the aforementioned eleventh aspect or the frequency offset estimating apparatus according to any of the aforementioned first to eighth aspects.

According to yet another aspect of the present invention, there is provided a computer readable medium storing the computer program.

According to the frequency offset estimating apparatus and method for an optical coherent receiver of the present invention, multiplication of complex numbers is dispensed with, computational complexity is greatly reduced, and reliable, precise and fast frequency offset estimation is achieved.

BRIEF DESCRIPTION OF THE DRAWINGS

The accompanying drawings constitute a part of the present application and make explanation to the preferred embodiments of the present invention together with the Description. The aforementioned and other objectives, characteristics and advantages of the present invention will be apparent through detailed explanations with reference to the accompanying drawings, in which.

DETAILED DESCRIPTION OF THE PREFERRED EMBODIMENTS

Figure 1:
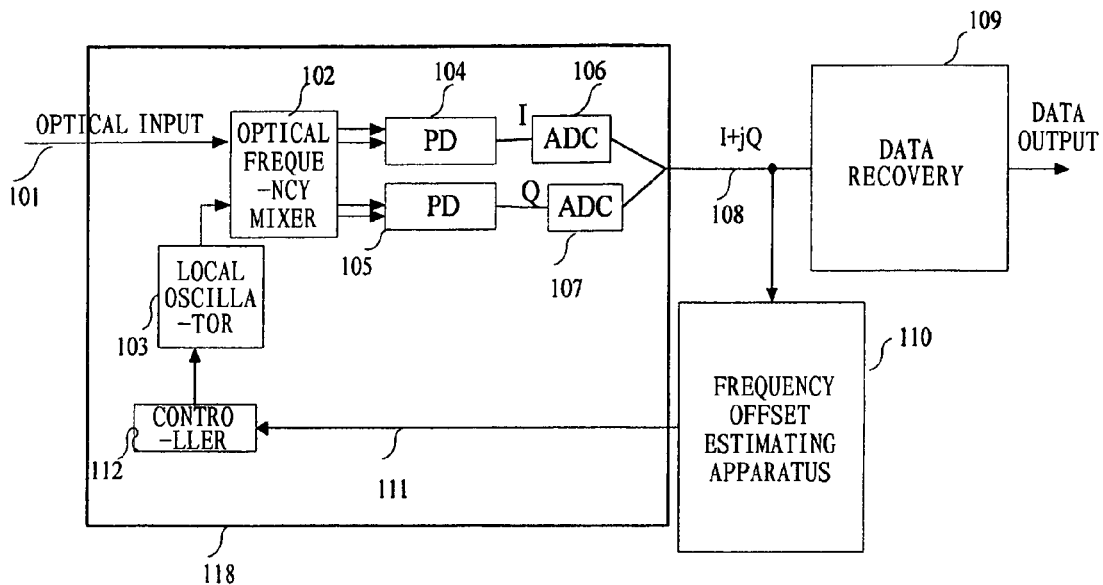
FIG. 1 illustrates the position of a prior art frequency offset estimating apparatus in an optical coherent receiver.
Figure 2:
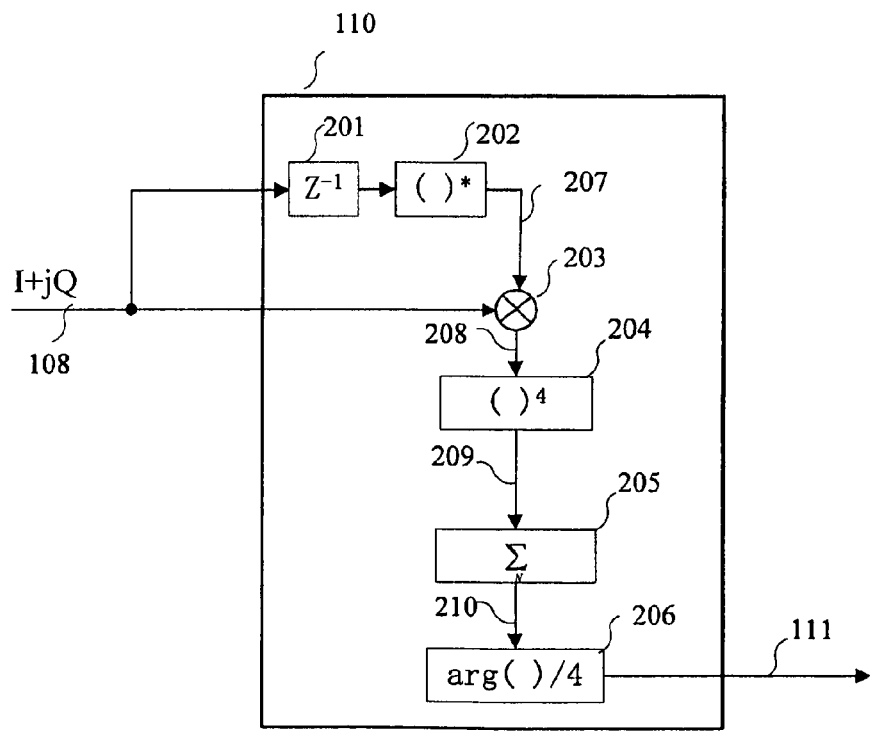
FIG. 2 shows a prior art frequency offset estimating apparatus.

Preferred embodiments are explained in greater detail below with reference to the accompanying drawings. The explanations are exemplary of, rather than restrictive to, the present invention. Identical reference numerals indicate identical or corresponding component parts throughout the drawings.

Figure 3:
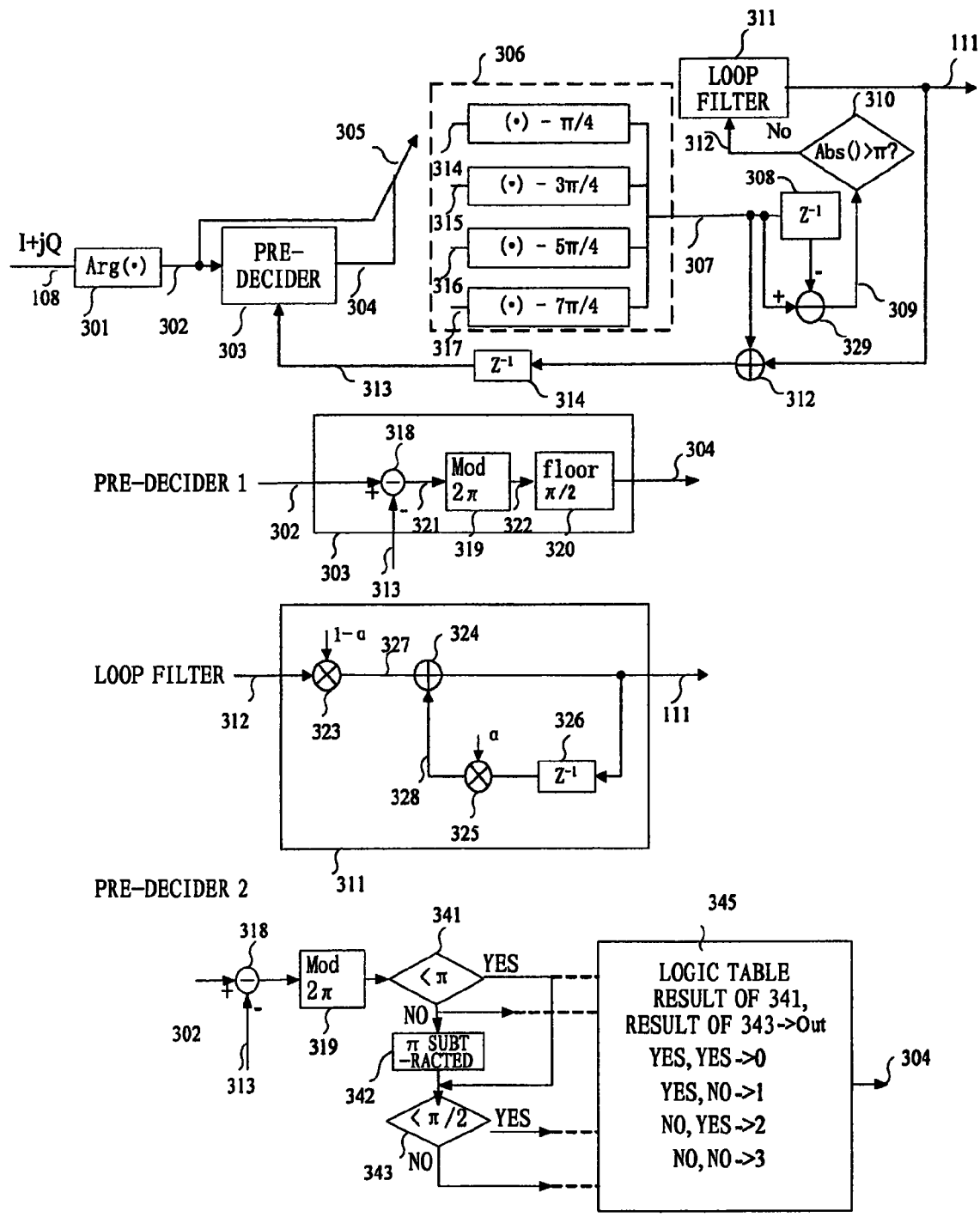
FIG. 3 shows a frequency offset estimating apparatus according to one embodiment of the present invention.

FIG. 3 shows a frequency offset estimating apparatus according to one embodiment of the present invention. Its input is a base band electric signal 108 outputted by a front end processing section 118 of the optical coherent receiver, namely $I+jQ=\exp(j\phi_d+j\phi_0+j\Delta\omega t)$. In general cases, the argument of the base band electric signal 108 contains not only data information $\phi_d$, but also a phase offset between the carrier wave and the local oscillation, while the phase offset contains two parts, one of which is phase noise $\phi_0$, and another of which is a phase offset $\Delta\omega t$ (where t indicates time) introduced by the frequency offset. Based on the characteristics of the laser, it can be considered that $\phi_0$ is invariant within several adjacent symbols, whereas it is obvious that $\Delta\omega t$ varies with variations in time. The objective of the present invention rests in how to estimate the frequency offset $\Delta\omega$. The following explanation is based on the QPSK modulation mode, namely $\phi_d \in \pi/4, 3\pi/4, 5\pi/4, 7\pi/4$, as an example.

The base band electric signal 108 is first inputted into an argument calculator 301 to obtain the argument 302 of the base band electric signal 108. A pre-decider 303 performs a general judgment on the transmitted information in accordance with the argument 302 and a phase offset 307 of a previous symbol as well as a phase offset change 111 (namely frequency offset value ΔωT, where T indicates the symbol period) after one symbol period as introduced by the frequency offset, and outputs a pre-decided value 304 as a switch control signal to control a select switch 305. The purpose of the pre-decision is to generally obtain the data information $\phi_d$ of the base band electric signal 108. The pre-decided value 304 can be 0, 1, 2, 3, which respectively indicate $\phi_d=\pi/4$, $3\pi/4$, $5\pi/4$, $7\pi/4$. The select switch 305 couples the argument 302 of the base band electric signal to input ports 314, 315, 316 or 317 of a phase offset calculating unit 306 in accordance with the switch control signal 304. The phase offset calculating unit 306 subtracts the pre-decided data information $\phi_d$ from the argument 302, and the difference obtained thereby is the phase offset 307 of the symbol. For instance, when the switch control signal 304 is zero, the select switch 305 couples the argument 302 to the port 314, and the phase offset 307 obtained thereby is a result of subtracting $\pi/4$ from the argument 302. Similarly, when the switch control signal 304 is 1, the select switch 305 couples the argument 302 to the port 315, and the phase offset 307 obtained thereby is a result of subtracting $3\pi/4$ from the argument 302. When the switch control signal 304 is 2, the select switch 305 couples the argument 302 to the port 316, and the phase offset 307 obtained thereby is a result of subtracting $5\pi/4$ from the argument 302. When the switch control signal 304 is 3, the select switch 305 couples the argument 302 to the port 317, and the phase offset 307 obtained thereby is a result of subtracting $7\pi/4$ from the argument 302.

A phase offset of a previous symbol stored in a register 308 is subtracted by a subtracter 329 from the phase offset 307 to output a phase offset change 309, namely ΔωT+n (where n indicates phase noise caused by channel white noise or electric noise of the receiver, etc.), having undergone one symbol period. Since the range of the argument 302 is [0, 2π], the calculated phase offset has 360° ambiguity; while when phase offsets of two symbols have 360° ambiguity of differing degrees, 360° ambiguity also appears in the phase offset change 309, whose value is no longer ΔωT+n by this time.

The following example illustrates the 360° ambiguity and the working principle of the decider. Assume the phase offsets of two adjacent symbols be $\theta_1$ and $\theta_2$ ($-\infty<\theta_1, \theta_2<+\infty$), and the output values of the phase offsets of the two symbols calculated by the phase offset calculating section 306 be $\hat{\theta}_1$ and $\hat{\theta}_2$. Since the output range of the argument 302 is [0, 2π], $\hat{\theta}_1$ and $\hat{\theta}_2$ have 360° ambiguity, that is, $\hat{\theta}_1=\theta_1+m\times 2\pi$, $\hat{\theta}_2=\theta_2+k\times 2\pi$ (where m and k are integers). Thus, the value of the phase offset change 309 is $\hat{\theta}_2-\hat{\theta}_1=\theta_2-\theta_1+(k-m)\times 2\pi$, when k is not equal to m, the 360° ambiguity appears in the phase offset change 309. The existence of the decider 310 is precisely to remove such 360° ambiguity. Setting of the threshold of the decider as π is based on the following reason: assume $|\theta_2-\theta_1|<\pi$, then, when k is not equal to m, $|\hat{\theta}_2-\hat{\theta}_1|<\pi$, thus it is possible to determine whether the 360° ambiguity appears in the phase offset change 309 by merely determining whether the absolute value of the phase offset change 309 is greater than π. From another perspective of view, the threshold of the decider also restricts the working range of the frequency offset estimating apparatus to [−Br/2, Br/2] (under the employment of $|\theta_2-\theta_1|<\pi$), when the symbol rate is 20 G symbol/second, the working range of the frequency offset estimating apparatus of this invention is [−10 GHz, 10 GHz], which covers the range of the frequency offset possibly occurring in the actual system. Ever dependent upon practical demand, the decider 310 may also employ other thresholds, such as π/2, in which case the working range of the frequency offset estimating apparatus is restricted to [−Br/4, Br/4]. If the threshold of π/4 is employed, the working range of the frequency offset estimating apparatus is restricted to [−Br/8, Br/8], in which case although the estimable frequency offset range is equivalent to that in the prior art, the present invention nonetheless has the advantages of stability, preciseness and fastness as it does not include complex calculation involving complex numbers. In other words, a person skilled in the art may employ different thresholds in accordance with specific applications. The decider 310 discards those values having ambiguities in accordance with the foregoing working principle and inputs a phase offset change 312 containing no 360° ambiguity to a loop filter 311. The loop filter 311 removes noise by a weighted sliding average, and tracks the change of the frequency offset at the same time. The output (namely frequency offset 111, i.e., ΔωT) of the loop filter 311 is added with the phase offset 307 of the symbol by means of an adder 312, and the summation is the phase offset of the next symbol estimated. This estimated value is stored in a register 314 as a basis for pre-deciding the next symbol. At the same time, the frequency offset 111 is also taken as the output of the entire frequency offset estimating apparatus.

The pre-decider 303 can for instance be composed of a subtracter 318, a Mod 2π calculator (2π modulus calculator) 319 and a floor π/2 calculator 320. The subtracter 318 subtracts an estimated phase offset 313 of an inputted symbol from the argument 302 of the symbol, so that the output 321 of the subtracter 318 is substantially the data information of the inputted symbol. The Mod 2π calculator 319 performs 2π modulus calculation on the output 321 to restrict it between 0 to 2π to obtain an output 322. The floor π/2 calculator (π/2 quotient rounder) 320 firstly divides the data phase by π/2 (as should be noted, π/2 employed here is only exemplary, as it is easily achievable. Other values such as 2π/5 can also be employed as long as the switch control signal can be obtained after rounding up), and then rounds up the integral portion of the quotient and outputs it to obtain the switch control signal 304. Thus, when $\theta_d=\pi/4, 3\pi/4, 5\pi/4, 7\pi/4$, the output 304 of the pre-decider is respectively 0, 1, 2, 3.

FIG. 3 additionally shows another pre-decider. As shown in the lower portion of FIG. 3, the pre-decider 303 comprises a subtracter 318, a Mod 2π calculator 319, a first deciding section 341, a subtracter 342, a second deciding section 343 and a lookup table determining section 345. The first deciding section 341 decides whether the output (namely the restricted data phase) of the Mod 2π calculator 319 is less than π. If the output is less than π, it enters the lookup table determining section 345; if the output is not less than π, it enters the second deciding section 343 after subtraction of π in the subtracter 342. The second deciding section 343 decides whether its input is less than π/2, and outputs the decided value. The lookup table determining section 345 outputs the switch control signal 304 in accordance with the deciding results of the deciding sections 341 and 343. Its conversion relationship is as shown in FIG. 3. As should be noted, both π/2 and π employed here are exemplary in nature rather than restrictive to the present invention.

The loop filter 311 is composed of multipliers 323, 325, an adder 324 and a register 326. The multiplier 323 multiplies the inputted phase offset change 312 with a fixed coefficient (1−α) and obtains an output 327 (α is a real number greater than zero and less than 1). The adder 324 adds the output 327 to a signal 328 (as to be explained later, the signal 328 is the weighted frequency offset of the previous symbol) to output the frequency offset 111. The frequency offset 111 is inputted to the register 326 at the same time. After the data in the register 326 is multiplied with a fixed coefficient α by the multiplier 325, an output 328 is obtained to enter the adder 324 for processing of the next input.

The loop filter 311 is used to suppress noise of the estimated value to obtain stably and precisely estimated values. In the embodiment shown above, the loop filter 311 performs only one sliding, that is to say, weighted average is performed only with the previous frequency offset. As should be aware to persons skilled in the art, multi-level sliding can also be performed, that is to say, weighted average is performed with the estimated frequency offsets of a plurality of previous symbols, in which case the summation of the coefficients of the plurality of symbols should still be maintained as 1. The coefficient decides the rate of sliding, and hence determines a compromise between noise suppression and change tracking (namely response time). The value of the coefficient should be selected in accordance with the desired response time.

The frequency offset estimating apparatus as shown in FIG. 3 needs to process each arriving data symbol. In other words, all calculations in FIG. 3 should be completed within one symbol period. Thus, when the data rate of the transmission system is extremely high (at a rate of tens of Gbit per second, for instance), the frequency offset estimating apparatus as shown in FIG. 3 could also be problematic in difficulties for implementation of hardware. As regards such a problem, the present invention proposes a method for low-rate implementation of the frequency offset estimating apparatus in FIG. 4.

Figure 4A:
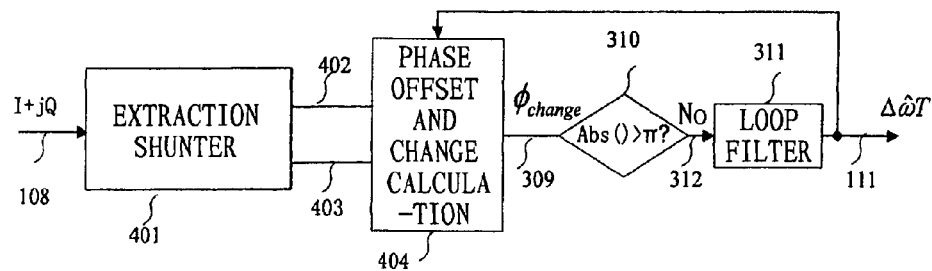
FIG. 4 shows a frequency offset estimating apparatus according to another embodiment of the present invention.

As shown in FIG. 4(a), the low-rate implemented frequency offset estimating apparatus comprises an extraction shunter 401, a phase offset and change calculator 404, an ambiguity decider 310 and a loop filter 311. In comparison with FIG. 3, the low-rate implementation in FIG. 4 is mainly added the extraction shunter 401 and the phase offset calculating section with the phase offset change calculating section is integrated as the phase offset and change calculator 406. The extraction shunter can be implemented by the structure shown in FIG. 4(b) or FIG. 4(c).

Figure 4B:
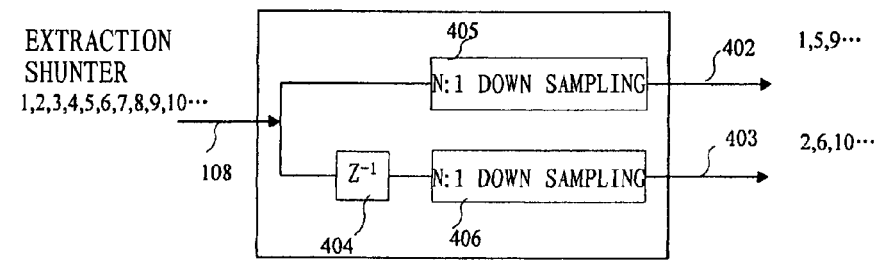
Figure 4C:
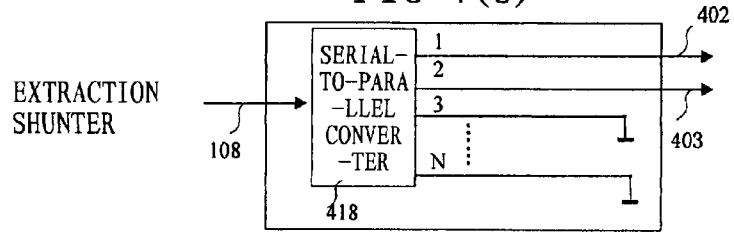

The extraction shunter shown in FIG. 4(b) comprises a register 404 and two N to 1 under samplers 405 and 406. The base band digital signal 108 is shunted into two branches, one of which is directly inputted to the down sampler 405, and another of which is inputted to the down sampler 406 after having been delayed by the register 404 by one symbol. The down samplers 405 and 406 perform N to 1 extraction on the inputted base band digital signals to respectively obtain output digital signals 402 and 403. FIG. 4(c) shows an extraction shunter implemented by a serial-to-parallel converter. The base band digital signal 108 is inputted to the serial-to-parallel converter 418. Outputs of the first two ports of the N output ports of the serial-to-parallel converter 418 are the required signals 402 and 403, while the remaining output ports of the serial-to-parallel converter 418 are grounded. Of course, it is also possible to use two adjacent ports other than the first two ports in the N output ports of the serial-to-parallel converter 418 as the output ports. The example as shown in FIG. 4(a) illustrates the relationship between the signals 402/403 and the base band digital signal 108 when the extraction ratio (N:1) is 4: after passing through the extraction shunter, the first, fifth and ninth symbols in the first to tenth symbols of the base band signal are taken as the output 402, while the second, sixth and tenth symbols are taken as the output 403. As can be seen from this example, the output 403 is always the next symbol of the output 402. Although the foregoing is illustrated with the extraction ratio being 4, it is nonetheless obvious to a person skilled in the art that the output 403 is always the next symbol of the output 402 regardless of what the extraction ratio might be. The outputs 402 and 403 are inputted to the phase offset and change calculating section.

Figure 4D:
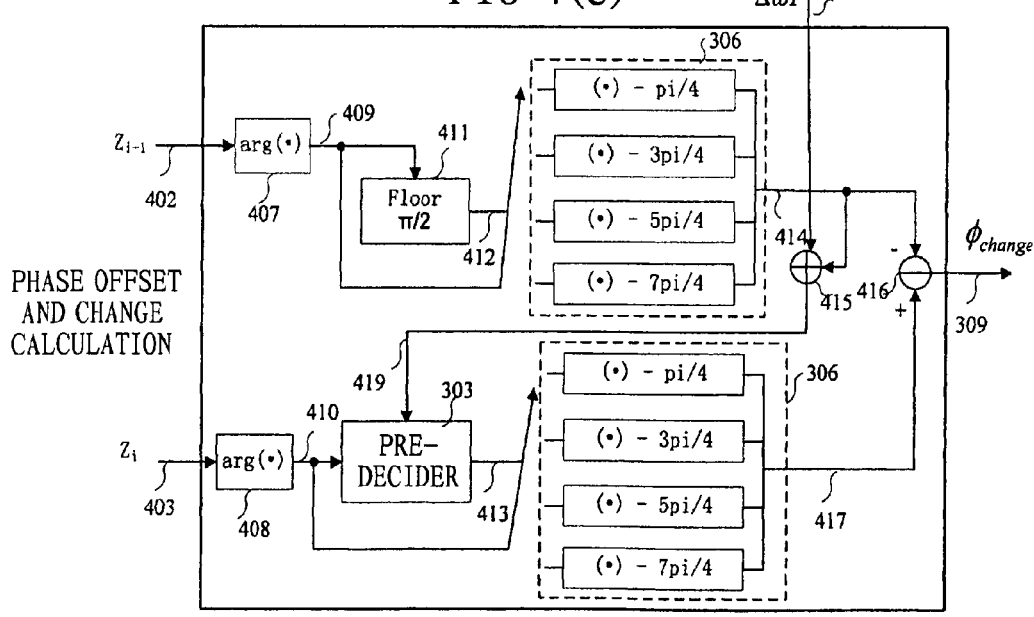

As shown in FIG. 4(d), an argument 409 of the symbol is obtained from the output 402 by means of an argument calculator 407, and a floor π/2 calculator 411 divides the inputted argument 409 by π/2, rounds up the integral portion of its quotient and outputs the result. The output 412 as a switch control signal inputs the inputted argument 409 to the phase offset calculating section 306. Operations of the switch control signal 412 and the phase offset calculating section 306 are identical with the operations of the corresponding component parts shown in FIG. 3. The output 414 of the phase offset calculating section 306 is added to the estimated frequency offset 111 by an adder 415 to obtain an estimated value 419 with regard to the phase offset of the symbol of the output 403, and this value 419 is inputted to the pre-decider 303. The pre-decider 303 generates and outputs the switch control signal 413 in accordance with the estimated value 419 and the argument 410 of the symbol of the output 403. Under control by the switch control signal 413, the argument 410 is inputted to another phase offset calculator 306 to obtain the phase offset 417 of the symbol of the output 403. Phase offsets 417 and 414 are subtracted by means of the subtracter 416 to obtain the phase offset change 309 of the adjacent symbol. Follow-up processing (such as ambiguity judgment and loop filtering etc.) of the phase offset change 309 is identical with that of the embodiment shown in FIG. 3.

As should be noted, however, in the embodiment shown in FIG. 4 the floor π/2 calculator 411 can also be implemented by a pre-decider which takes phase offset as zero (i.e., the input 313 of the pre-decider shown in FIG. 3 is regarded as zero). It is thus possible for the component parts 411 and 303 to be implemented by the same component parts.

As should be further noted, although the adder 415 is employed in FIG. 4, this adder 415 can also be dispensed with, in which case the frequency offset 111 and the phase offset 414 are directly inputted to the pre-decider for subtraction therein.

In summary, by means of extraction shunting, the embodiment as shown in FIG. 4 reduces the requirement of necessarily completing all calculations within one symbol period to completing within N symbol periods in terms of structure (where N indicates extraction ratio). The influence on performance is merely the increase of the response time (while the precision and range of estimation are not affected). In terms of specific hardware implementation, it is possible to select an appropriate extraction ratio in accordance with the processing capability and the response time required of the hardware.

Figure 5:
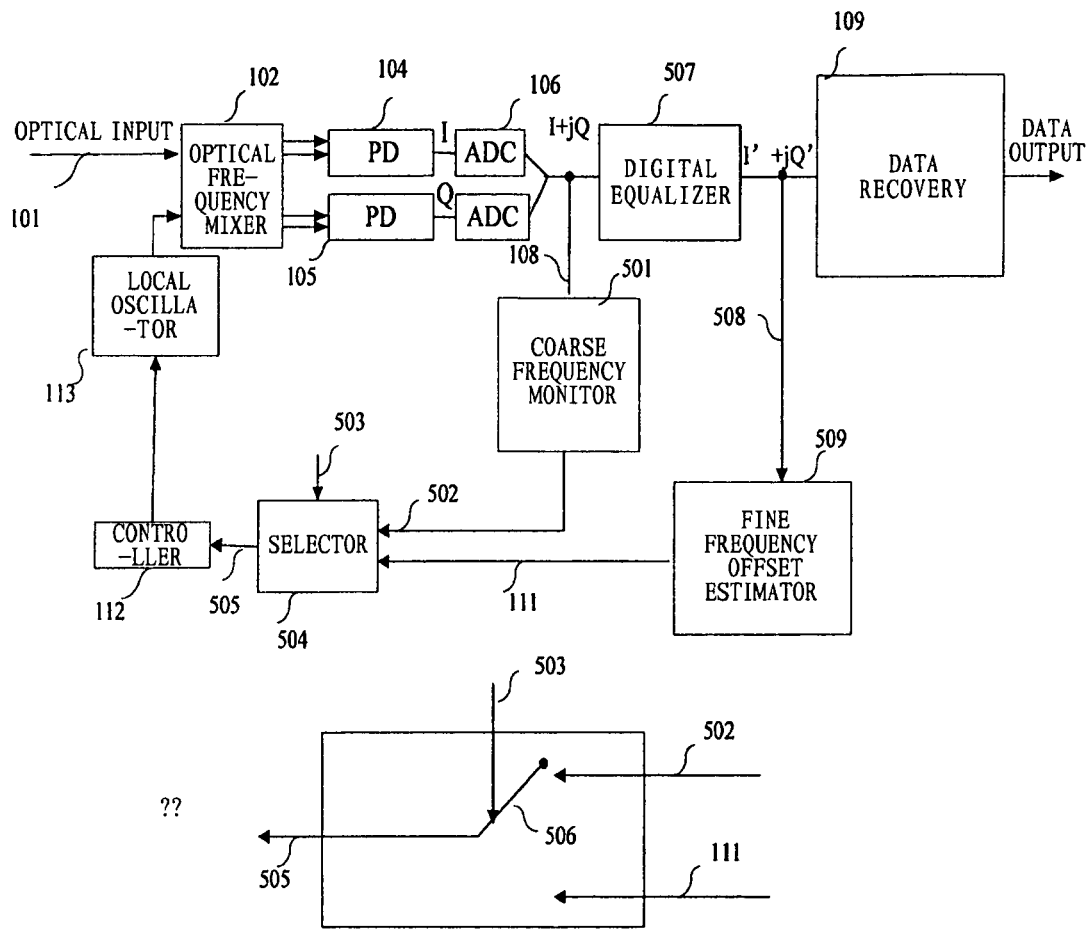
FIG. 5 shows an optical coherent receiver according to one embodiment of the present invention.

The frequency offset estimating apparatus according to the present invention can be directly used in the optical coherent receiver as shown in FIG. 1 to replace the conventional estimator 110. FIG. 5 illustrates another optical coherent receiver that makes use of the frequency offset estimating apparatus according to the present invention. Coarse estimation of and compensation to frequency offset have already been performed in this optical coherent receiver. Reference can be made to Chinese Patent Application 200710139769.1, whose entire contents are herein incorporated by reference, proposed by Zhenning Tao et al. for this receiver. As regards such an optical coherent receiver, the frequency offset estimating apparatus according to the present invention can be employed as a fine frequency offset estimating apparatus 509.

In the patent application by Zhenning Tao et al., the polarity of the output of the frequency offset monitor varies with variations in positivity and negativity of the frequency offset, so that the output of the monitor can be used as a feedback signal to control the frequency of the local oscillator. The monitor has so strong a robustness as to tolerate severe chrominance chromatic dispersion and polarization mode chromatic dispersion as well as the problem of no synchronous clocks between transmitted/received data. But this monitor is problematic in the fact that, when the frequency offset is less than a certain range (say, 1 GHz), the monitor would send erroneous detection signals. Whereas the frequency offset within such range is still so great as to be unbearable to optical coherent reception. In comparison with FIG. 1, added to FIG. 5 are a digital equalizer 507, a coarse frequency offset monitoring device 501, a selection control device 503, and a selector 504 specific for the frequency offset estimating apparatus. The function of the digital equalizer 507 is to equalize the base band digital signal 108 to remove the influence of chrominance chromatic dispersion and polarization mode chromatic dispersion. The digital equalizer 507 can be implemented by publicly known techniques (such as "*Adaptive digital equalization in the presence of chromatic dispersion, PMD, and phase noise in coherent fiber optic systems*", Crivelli D. E et al., Global Telecommunications Conference, 2004, Page(s): 2545-2551 Vol. 4). The input 108 of the coarse frequency offset monitor 501 in FIG. 5 is a signal before the digital equalizer 507, while the input 508 of the fine frequency offset estimating apparatus is a signal having passed through the digital equalizer 507. The selector 504 as shown in FIG. 5 includes a switch 506 that switches the output 502 of the coarse frequency offset monitor or the output 111 of the fine frequency offset estimating apparatus to the input of the frequency controller 112 of the local oscillator in accordance with a control signal 503.

Figure 6:
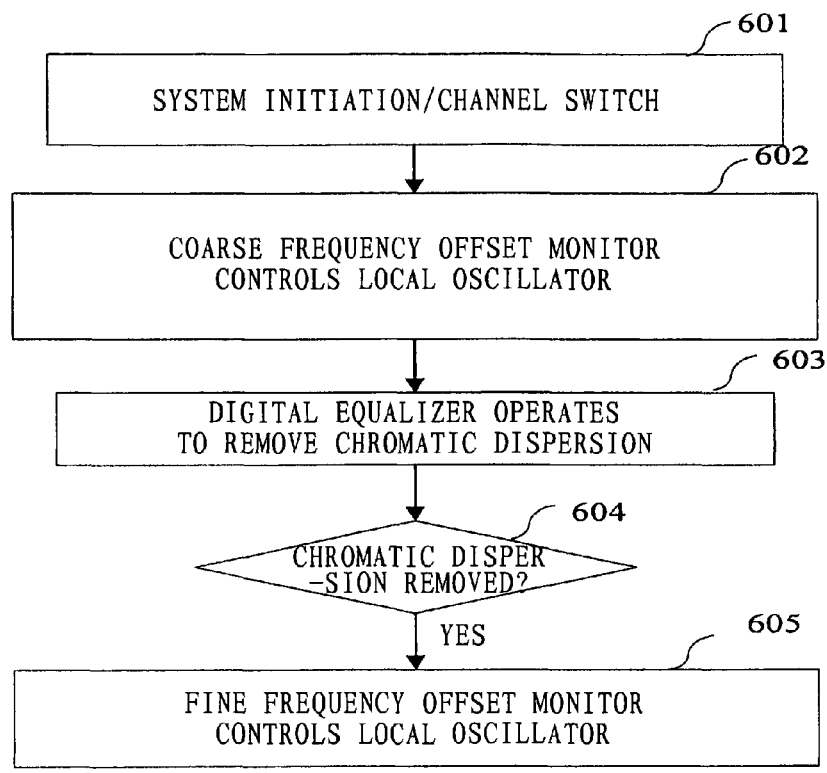
FIG. 6 shows the flow for controlling local oscillation frequency by using the frequency offset outputted by the frequency offset estimating apparatus.

FIG. 6 shows the operating flow of the frequency offset estimating apparatus of the optical coherent receiver shown in FIG. 5.

As shown in FIG. 6, during start/restart or channel switch of the receiver (Step 601), the selector 504 switches the output 505 to connect to the input 502 (Step 602). At this time, the coarse frequency monitoring device 501 starts to control the local oscillator. Subsequently, when the coarse frequency offset monitoring device 501 controls the frequency offset to a certain degree, the digital equalizer 507 begins to normally operate to remove the influence of the chrominance chromatic dispersion and polarization mode chromatic dispersion (Step 603). It is subsequently determined as to whether the influence of the chrominance chromatic dispersion and polarization mode chromatic dispersion is removed (Step 604): if it is removed (Step 604, YES), the selector 504 switches the output 505 to connect to the input 111, and the fine frequency offset estimating apparatus 509 starts to control the local oscillator (Step 605).

As can be seen from the foregoing operating flow, the criterion deciding the fine frequency offset estimating apparatus to start to control the local oscillator is the fact that the influence of the chrominance chromatic dispersion and polarization mode chromatic dispersion has already been substantially removed (Step 604 in FIG. 6, YES). Therefore, the control signal 503 of the selector can be determined by an error signal of the digital equalizer, and can also be obtained via a method of detecting the residue chrominance chromatic dispersion and polarization mode chromatic dispersion in the monitor signal 508. Detection of the chrominance chromatic dispersion and polarization mode chromatic dispersion can be carried out via publicly known techniques, such as *Fiber chromatic dispersion and polarization-mode dispersion monitoring using coherent detection*, Biao Fu et al. Photonics Technology Letters, IEEE, Volume 17, Issue 7, July 2005 Page(s):1561-1563.

Figure 7:
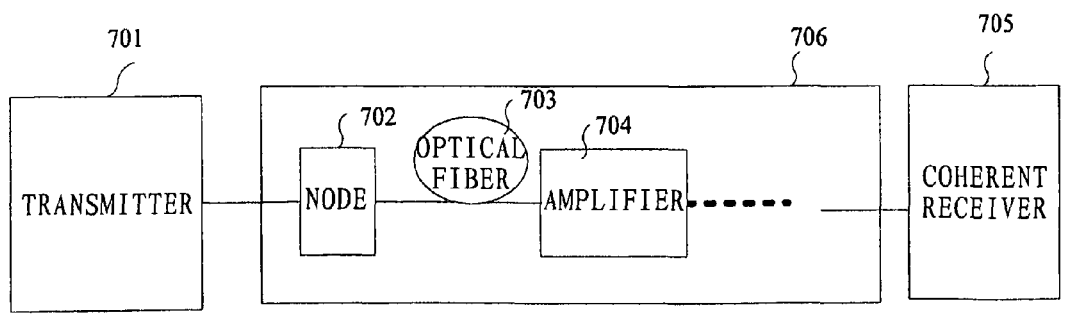
FIG. 7 shows an optical communication system employing the coherent receiver according to the present invention.

FIG. 7 shows an optical communication system employing the optical coherent receiver according to the present invention. This system is composed of a transmitter 701, an optical fiber link 706 and a receiver 705. The optical fiber link may include one or more nodes 702, an optical fiber 703 and an amplifier 704. Except for the optical coherent receiver 705 of this invention, the remaining component parts above can be configured according to publicly known technologies, such as the transmitter technology published in "*Optical Differential Quadrature Phase-Shift Key (oDQPSK) for High Capacity Optical Transmission*" R. A. Griffin et al., OFC 2002.

Figure 8:
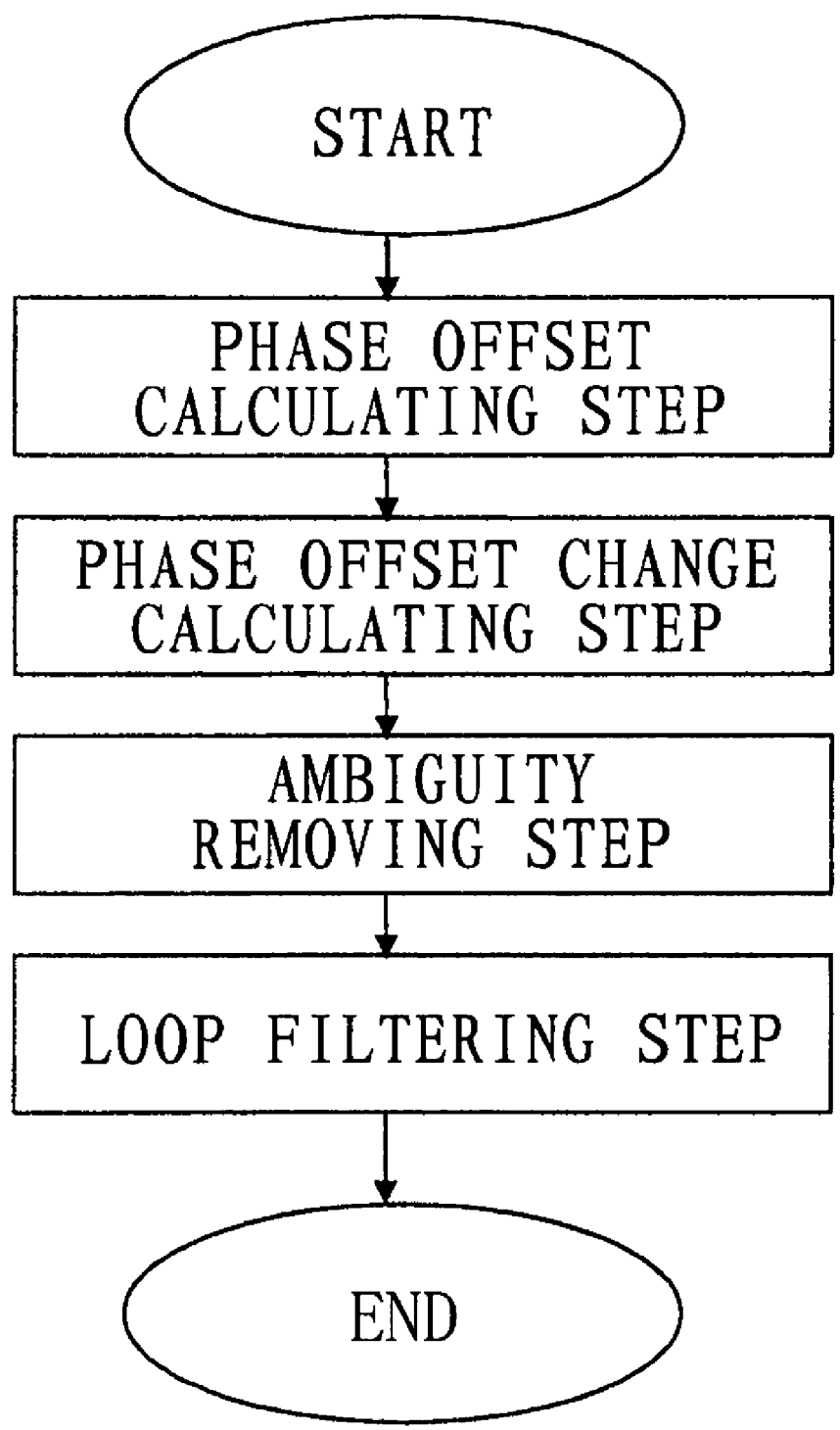
FIG. 8 is a schematic flowchart showing the frequency offset estimating method according to the present invention.

FIG. 8 is a flowchart showing the frequency offset estimating method according to the present invention. This frequency offset estimating method is applied to the coherent receiver according to the present invention as explained above. As shown in FIG. 8, the frequency offset estimating method comprises a phase offset calculating step, for calculating a phase offset in said base band digital electric signal; a phase offset change calculating step, for calculating a change of said phase offset, namely a phase offset change, in accordance with the phase offset calculated in said phase offset calculating step; an ambiguity deciding step, for deciding whether there is ambiguity in said phase offset change calculated in said phase offset change calculating step, and outputting the phase offset change having no ambiguity; and a loop filtering step, for acquiring a weighted average of the phase offset change outputted from said ambiguity deciding step.

Of these, the phase offset calculating step can for instance be carried out by the aforementioned argument calculator 301, the pre-decider 303 and the phase offset calculating unit 306. The phase offset change calculating step can for instance be carried out by the aforementioned register 308 and the subtracter 309. The ambiguity deciding step can for instance be carried out by the aforementioned decider 310, and the loop filtering step can for instance be carried out by the aforementioned loop filter 311. Since these component parts have all been antecedently explained in detail, it will be easy for a person ordinarily skilled in the art to comprehend and carry out these steps upon review of the present application documents, and these steps are therefore not explained in detail below.

The apparatus according to the present invention can be implemented by computer software, which enables a computer to carry out the functions of the aforementioned apparatus or enables the computer to execute the steps of the aforementioned method. The computer can for instance be a general-purpose computer comprising a CPU, an ROM, input and output means, a hard disk, and an RAM etc., and can also be a dedicated computer. The computer program can be a single computer program or a suite of programs consisting of a plurality of computer programs.

The computer program or suite of programs can be stored on a computer readable storage medium, which can for instance be a CD, a DVD, a floppy disk, a flash memory, a magnetic disk or any other media known to persons skilled in the art.

The foregoing explanations to the present invention are exemplary and interpretative of, rather than restrictive to, the present invention. The scope of the present invention is defined by the claims as attached and analogues thereof. A person skilled in the art may make various variations and modifications to the present invention, and the present invention aims to cover these variations and modifications.

What is claimed is:

1. A frequency offset estimating apparatus for an optical coherent receiver including a front end processer that changes an optical signal into a base band digital electric signal, said frequency offset estimating apparatus comprising:
- a phase offset calculator that calculates a phase offset in said base band digital electric signal;
- a phase offset change calculator that calculates a change of said phase offset, namely a phase offset change, in accordance with the phase offset calculated by said phase offset calculator;
- an ambiguity deciding section that compares a predetermined threshold value with the absolute value of said phase offset change calculated by said phase offset change calculator, and outputs the phase offset change when the absolute value is less than the predetermined threshold value; and
- a loop filter that acquires a weighted average of the phase offset change outputted by said ambiguity deciding section.

2. The frequency offset estimating apparatus for an optical coherent receiver according to claim 1, wherein said predetermined threshold value is $\pi/4$ or $\pi/2$ or $\pi$.

3. The frequency offset estimating apparatus for an optical coherent receiver according to claim 1, wherein said optical coherent receiver employs a QPSK modulation mode.

4. The frequency offset estimating apparatus for an optical coherent receiver according to claim 1,
wherein said phase offset calculator comprises an argument calculator, a pre-decider and an argument-based phase offset calculator, wherein said argument calculator acquires an argument of the base band digital electric signal; said pre-decider decides data information of said base band digital electric signal in accordance with the argument acquired by said argument calculator, a previous phase offset calculated by said phase offset calculator and a previous output of said loop filter; and said argument-based phase offset calculator calculates the phase offset in said base band digital electric signal in accordance with a deciding result of said pre-decider;
wherein said phase offset change calculator comprises a phase offset register and a subtractor, wherein said phase offset register registers the phase offset calculated by said phase offset calculator; and said subtractor subtracts a previous phase offset registered in said phase offset register from a current phase offset calculated by said phase offset calculator to acquire said phase offset change.

5. The frequency offset estimating apparatus for an optical coherent receiver according to claim 1,
wherein said phase offset calculator comprises an extraction shunter, a first phase offset calculator and a second phase offset calculator, wherein said extraction shunter acquires two shunting signals, namely a first shunting signal and a second shunting signal, formed by adjacent symbols in said base band digital electric signal;
wherein said first phase offset calculator calculates a phase offset of said first shunting signal; and said second phase offset calculator calculates a phase offset of said second shunting signal; and
wherein said phase offset change calculator comprises a subtractor for subtracting the phase offset of said second shunting signal calculated by said second phase offset calculator from the phase offset of said first shunting signal calculated by said first phase offset calculator to acquire said phase offset change.

6. The frequency offset estimating apparatus for an optical coherent receiver according to claim 5,
wherein said first phase offset calculator comprises a first argument calculator, a first pre-decider and a first offset calculating unit, wherein said first argument calculator acquires an argument of said first shunting signal; said first pre-decider decides data information of said first shunting signal in accordance with the argument acquired by said first argument calculator; and said first offset calculating unit calculates the phase offset in said first shunting signal in accordance with a deciding result of said first pre-decider; and
wherein said second phase offset calculator comprises a second argument calculator, a second pre-decider and a second offset calculator unit, wherein said second argument calculator acquires an argument of said second shunting signal; said second pre-decider decides data information in said second shunting signal in accordance with the argument acquired by said second argument calculator, the phase offset in said first shunting signal calculated by said first phase offset calculator and an output fed back from said loop filter; and said second offset calculating unit calculates the phase offset in said second shunting signal in accordance with a deciding result of said second pre-decider.

7. An optical coherent receiver, further comprising the frequency offset estimating apparatus for an optical coherent receiver according to claim 1.

8. The optical coherent receiver according to claim 7, further comprising a coarse frequency offset monitor, a digital equalizer and a selector, wherein said coarse frequency offset monitor receives a signal previous to said digital equalizer; said frequency offset estimating apparatus for an optical coherent receiver receives a signal outputted from said digital equalizer; and said selector selects one output of said coarse frequency offset monitor and said frequency offset estimating apparatus for an optical coherent receiver in accordance with a residue chrominance chromatic dispersion and a polarization mode chromatic dispersion in the signal outputted from said digital equalizer.

9. A frequency offset estimating method for an optical coherent receiver including a front end processing section for changing an optical signal into a base band digital electric signal, said frequency offset estimating method comprising:
- calculating a phase offset in said base band digital electric signal;
- calculating a change of said phase offset, namely a phase offset change, in accordance with the phase offset calculated;
- comparing a predetermined threshold value with the absolute value of said phase offset change calculated;
- outputting the phase offset change when the absolute value is less than the predetermined threshold value; and
- acquiring a weighted average of the phase offset change outputted.

* * * * *

UNITED STATES PATENT AND TRADEMARK OFFICE
CERTIFICATE OF CORRECTION

PATENT NO. : 8,078,066 B2
APPLICATION NO. : 12/289072
DATED : December 13, 2011
INVENTOR(S) : Lei Li et al.

Page 1 of 1

It is certified that error appears in the above-identified patent and that said Letters Patent is hereby corrected as shown below:

Column 12, Line 67, In Claim 1, delete "processer" and insert -- processor --, therefor.

Column 14, Line 18, In Claim 6, delete "calculator" and insert -- calculating --, therefor.

Signed and Sealed this
Sixth Day of March, 2012

David J. Kappos
*Director of the United States Patent and Trademark Office*